United States Patent
Sato

(10) Patent No.: US 7,589,713 B2
(45) Date of Patent: Sep. 15, 2009

(54) CAPACITIVE COORDINATE DETECTION DEVICE

(75) Inventor: Tadamitsu Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 786 days.

(21) Appl. No.: 11/206,319

(22) Filed: Aug. 16, 2005

(65) Prior Publication Data

US 2006/0077181 A1 Apr. 13, 2006

(30) Foreign Application Priority Data

Oct. 7, 2004 (JP) .............................. 2004-294526

(51) Int. Cl.
G09G 5/00 (2006.01)
(52) U.S. Cl. ........................ 345/169; 345/168; 345/170; 345/173
(58) Field of Classification Search ................. 345/173, 345/84, 103, 168–170
See application file for complete search history.

(56) References Cited

U.S. PATENT DOCUMENTS

| | | | |
|---|---|---|---|
| 4,609,792 A * | 9/1986 | Levasseur | 200/5 A |
| 6,204,839 B1 * | 3/2001 | Mato, Jr. | 345/168 |
| 6,704,005 B2 | 3/2004 | Kato et al. | |
| 2002/0049070 A1 | 4/2002 | Bick | |
| 2003/0025679 A1 * | 2/2003 | Taylor et al. | 345/175 |
| 2004/0130533 A1 * | 7/2004 | Lin | 345/173 |
| 2005/0030048 A1 * | 2/2005 | Bolender et al. | 324/661 |

* cited by examiner

*Primary Examiner*—Amr Awad
*Assistant Examiner*—Tony Davis
(74) *Attorney, Agent, or Firm*—Brinks Hofer Gilson & Lione

(57) ABSTRACT

A composite capacitance between a common electrode and an X detection electrode having a plurality of detours is small, whereas lengths of parallel electrodes of the X detection electrode are set to have large values. A comprehensive composite capacitance is set to be constant by increasing a composite capacitance between the common electrode and the X detection electrode. For this reason, although the detours are formed in the electrode patterns, a coordinate position can be detected with high accuracy.

11 Claims, 10 Drawing Sheets

CAPACITIVE COORDINATE DETECTION DEVICE

This application claims the benefit of priority to Japanese Patent Application No. 2004-294526, filed on Oct. 7, 2004, herein incorporated by reference.

BACKGROUND OF THE INVENTION

1. Field of the Invention

The present invention relates to a coordinate detection device mounted in an information terminal apparatus, such as cellular phones or PDAs. More particularly, the present invention relates to a capacitive coordinate detection device in which a plurality of X electrodes and a plurality of Y electrodes are arranged to cross each other at both sides of a base sheet.

2. Description of the Related Art

Japanese Unexamined Patent Application Publication No. 2002-123363 described below is an example of the related art.

In Japanese Unexamined Patent Application Publication No. 2002-123363, a switch element 11 in which a reversion plate 10 is disposed is provided at a lower side, and a capacitive coordinate detection device (a flat panel input device 4) is provided at an upper side. In the switch element 11, an electrode 13a1 disposed at the center of the switch element 11 and a ring-shaped electrode 13a2 disposed near the switch element 11 are formed on a resin sheet 12. Diaphragm type reversion plates 15 made of metal are disposed on a surface of the ring-shaped electrode 13a2. Meanwhile, the flat panel input device 4 includes a flexible resin sheet. X-direction detection electrodes and Y-direction detection electrodes are disposed opposite to each other on top and bottom surfaces of the resin sheet in a matrix. On the surface of the resin sheet is laminated a display sheet 7 in which characters, symbols, figures, or the like are printed.

If a finger that touches the display sheet 7 is strongly pressed, the reversion plates 15 are reversed. As the electrode 13a1 located at the center of the switch element 11 and the ring-shaped electrode 13a2 become conductive, the input as a switch is made possible. Furthermore, since the reversion plates 15 are reversed by operating the switch, it is possible to give a feeling of clicking to an operator.

In the above-described device, if characters are written while moving a finger that softly touches the surface of the display sheet 7, the flat panel input device 4 can detect a motion trace of the finger as positional data every time on an XY coordinate axis based on variations in a capacitance between the X electrodes and the Y electrodes. It is thus possible to input the characters.

An example of the capacitive coordinate detection device can include Japanese Unexamined Patent Application Publication No. 08-137607.

In the above-mentioned information terminal device, it is necessary to let an operator know the position of the switch (the positions of characters, etc.) even in the dark. Therefore, it is preferable that a light source such as a LED for brightly displaying characters, symbols, figures or the like, which are printed on surfaces of switch buttons be disposed within the device, and the rear surface of the display sheet 7 be illuminated from the inside of the device.

However, the flat panel input device 4 is disposed between the light source and the display sheet 7, and the plurality of X electrodes and Y electrodes disposed in the flat panel input device 4 shields light emitted from the light source. Thus, there is a problem in that the display sheet 7 is likely to become dark.

In order to overcome this problem, if the X electrodes and the Y electrodes are formed using a transparent electrode (ITO), light emitted from the light source can pass through the ITO and thus brightly shines the characters, thereby solving the problem. There is, however, a problem in that the production cost is likely to rise because ITO is expensive.

Furthermore, if holes through which light emitted from the light source can directly pass are formed in the flat panel input device 4, the rear surface of the display sheet 7 can be brightly illuminated.

If the holes are formed in the flat panel input device 4, however, the X electrodes and the Y electrodes must be disposed to detour the positions of the holes while avoiding the positions of the holes. In this case, lines (X and Y electrodes) having the detours and lines (X and Y electrodes) not having the detours are mixed depending on formation positions of the holes. Due to this, there is a problem in that a coordinate position cannot be detected correctly because a capacitance between the respective lines is greatly different.

Furthermore, the capacitive coordinate detection device disclosed in Japanese Unexamined Patent Application Publication No. 08-137607 is constructed such that one of the plurality of X electrodes and Y electrodes is grounded (minus electrode), and the other of the plurality of X electrodes and Y electrodes is applied with a plus voltage. The X electrodes and the Y electrodes become minus electrodes or plus electrodes, if needed. Although wiring patterns having a plurality of leading lines for connection to other circuits are formed in the X electrodes and the Y electrodes, they must be inevitably disposed in a state where they are densely arranged in the vicinity of the X electrodes or the Y electrodes disposed outside as portable terminal apparatuses are miniaturized.

However, if the wiring patterns are densely disposed in the vicinity of the X electrodes or the Y electrodes disposed outside, a capacitance for the X electrodes or the Y electrodes becomes unstable. Accordingly, there is also a problem in that it is difficult to correctly detect coordinate positions.

SUMMARY OF THE INVENTION

The present invention has been finalized in view of the drawbacks inherent in the conventional apparatus, and it is an object of the present invention to provide a capacitive coordinate detection device in which coordinate positions can be correctly detected even in the case where detours for detouring holes in a substrate must be inevitably formed in X electrodes and Y electrodes that detect the coordinate positions.

Furthermore, it is another object of the present invention to provide a capacitive coordinate detection device in which coordinate positions can be correctly detected even though leading lines are densely disposed in the vicinity of X electrodes or Y electrodes disposed outside.

According an aspect of the invention, there is provided a capacitive coordinate detection device in which a plurality of detection electrodes, which extend in the Y direction and are disposed with a predetermined gap in the X direction, each detection electrode being applied with a voltage, and a plurality of common electrodes, which are located between the detection electrodes adjacent to each other and extend in the Y direction, are formed in a base sheet. In this case, when a contact body serving as a conductor is brought into contact with or approaches the base sheet, variations in a capacitance between the detection electrodes and the common electrodes opposite to the detection electrodes are detected to detect a location of a place which the contact body touches or approaches on a XY coordinate plane. Further, when one of the common electrodes is set as a reference common electrode, one of the detection electrodes, which is adjacent to one side of the reference common electrode, is set as a first detection electrode, and one of the detection electrodes, which is adjacent to the other side of the reference common electrode, is set as a second detection electrode, detours that approach one of the reference common electrode and the first detection electrode, and the reference common electrode and the second detection electrode are formed in at least the other of the reference common electrode and the first detection electrode, and the reference common electrode and the second detection electrode in a specific place. For example, holes are formed in the base sheet, and detours are formed at sides of the holes.

Preferably, the operation members can be provided at one side of the base sheet, and electronic components operated by the operation members can be provided at the other side of the base sheet. In this case, some of the operation members pass through the holes to operate the electronic components.

Preferably, light sources for illumination can be disposed in the holes of the base sheet or the holes serve as passages of light emitted from the light sources.

Preferably, when a capacitance between the reference common electrode and the first detection electrode is set to CR and a capacitance between the reference common electrode and the second detection electrode is set to CL, a pattern of each of the electrodes is set such that a composite capacitance between the capacitance CR and the capacitance CL can be kept constant in such a manner that one of the two capacitances compensates for an increase or a decrease of the other of the two capacitances.

Preferably, common branch electrodes extending toward both sides of the X direction and formed with a predetermined gap in the Y direction can be formed in the reference common electrode, first auxiliary electrodes, which extend in the X direction and are opposite to the common branch electrodes, can be formed in the first detection electrode, and second auxiliary electrodes, which extend in the X direction and are opposite to the common branch electrodes, can be formed in the second detection electrode. Preferably, the common branch electrodes and the first auxiliary electrodes can be provided in the detours or near the detours, and the common branch electrodes and the second auxiliary electrodes are not opposite to each other in the detours or near the detours.

Preferably, common branch electrodes extending toward both sides of the X direction and formed with a predetermined gap in the Y direction are formed in the reference common electrode, first auxiliary electrodes, which extend in the X direction and are opposite to the common branch electrodes, are formed in the first detection electrode, and second auxiliary electrodes, which extend in the X direction and are opposite to the common branch electrodes, are formed in the second detection electrode. In addition, preferably, in the detours or near the detours, an opposite length between the common branch electrodes and the first auxiliary electrodes is larger than an opposite length between the common branch electrodes and the second auxiliary electrodes.

Preferably, the X direction can be replaced with the Y direction, and the Y direction can be replaced with the X direction.

Preferably, both a coordinate position of the X direction and a coordinate position of the Y direction of a contact place of the contact body can be input.

According to another aspect of the invention, there is provided a capacitive coordinate detection device including a base sheet having a plurality of holes formed therein, a plurality of X detection electrodes, which extend in the Y direction with a predetermined distance therebetween in the X direction and are disposed, on one surface of the base sheet, each X detection electrode being applied with a voltage, a plurality of Y detection electrodes, which extend in the X direction with a predetermined distance therebetween in the Y direction and are disposed, on the other surface of the base sheet, each Y detection electrode being applied with a voltage, a plurality of common electrodes that are opposite to both X detection electrodes adjacent to each other and Y detection electrodes adjacent to each other, the X detection electrodes and the Y detection electrodes being provided on one surface of the base sheet, a control unit for applying the voltage between the X detection electrodes and the common electrodes and between the Y detection electrodes and the common electrodes with a predetermined timing, and a plurality of leading lines connecting the X detection electrodes and the Y detection electrodes and the control unit. In this case, the leading lines are densely provided near the outside of the X detection electrodes or the Y detection electrodes located at one end, and holes are disposed opposite to the leading lines near the inside of the X or Y detection electrodes. Further, first adjustment electrodes, which adjust a capacitance between the X detection electrodes or the Y detection electrodes and the common electrodes by causing the X detection electrodes or the Y detection electrodes and the common electrode to be opposite to each other face to face, are formed on one of the X detection electrodes or the Y detection electrodes and the common electrode with the base sheet interposed therebetween.

In the present invention, although leading lines are densely disposed in the vicinity of Y detection electrodes or X detection electrodes disposed outside, or common electrodes that form a capacitance between the detection electrodes disposed outside cannot be disposed opposite to each other due to the formation of holes, the shortage of a capacitance can be supplemented. It is thus possible to correctly detect coordinate positions.

Preferably, second adjustment electrodes, which are adjacent to the first adjustment electrodes and opposite to each other at locations where the second adjustment electrodes do not overlap each other with the base sheet interposed therebetween, are formed in one of the X detection electrodes or the Y detection electrodes and the common electrode, which are opposite to each other with the base sheet therebetween.

In the above-mentioned unit, the shortage of a capacitance can be additionally supplemented.

Preferably, common counter electrodes, which are opposite to both a pair of X detection electrodes adjacent to each other and a pair of Y detection electrodes adjacent to each other and extend to detour the holes, can be disposed in the common electrodes.

Figure 6:
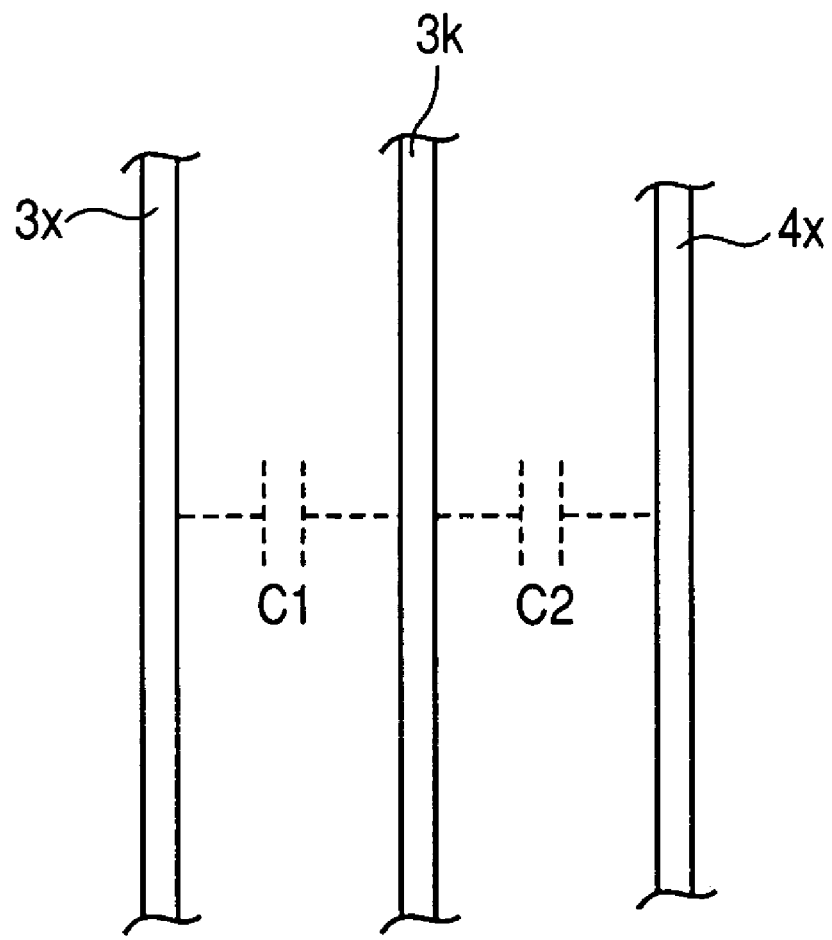
Figure 7:
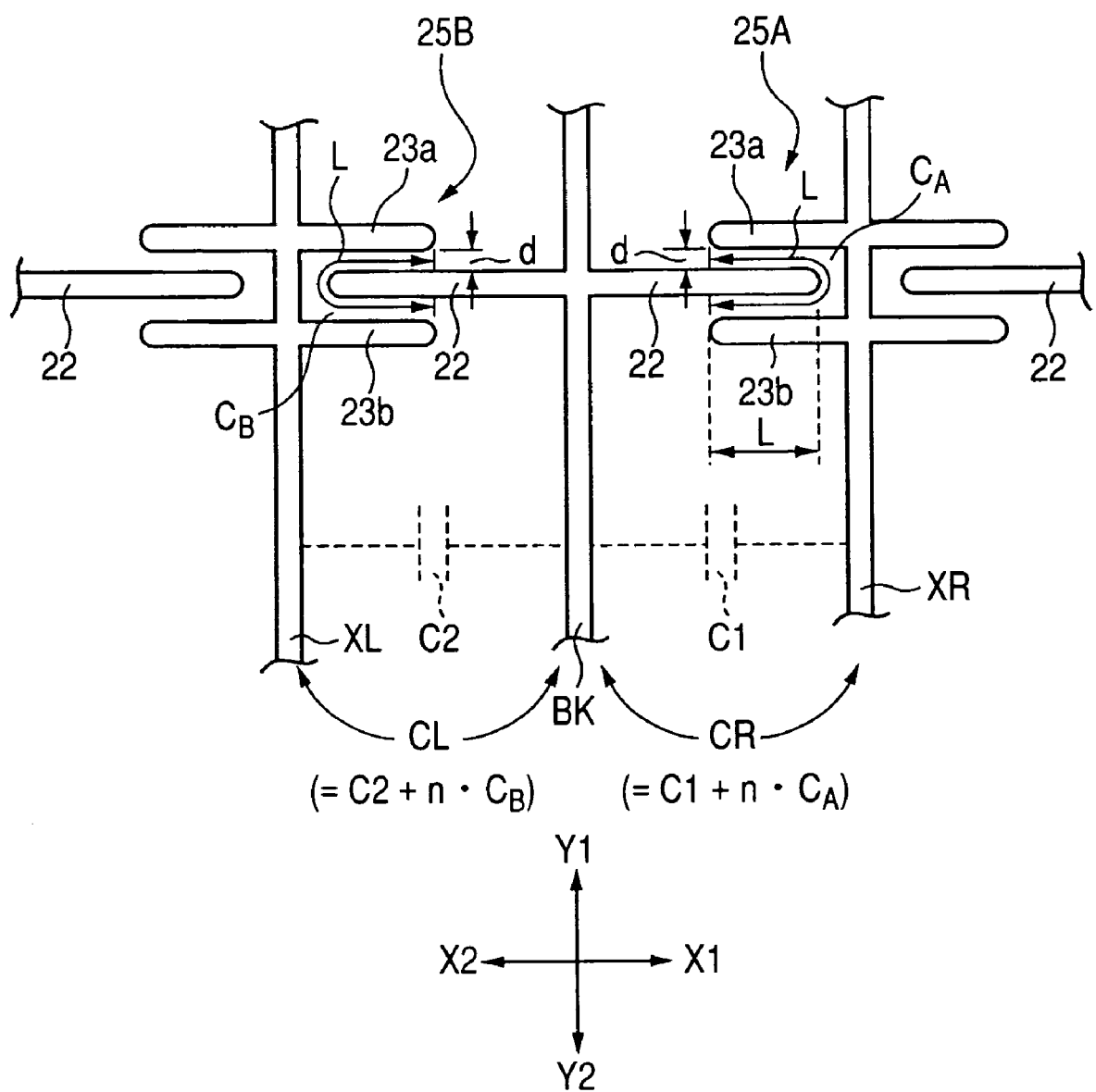
Figure 8:
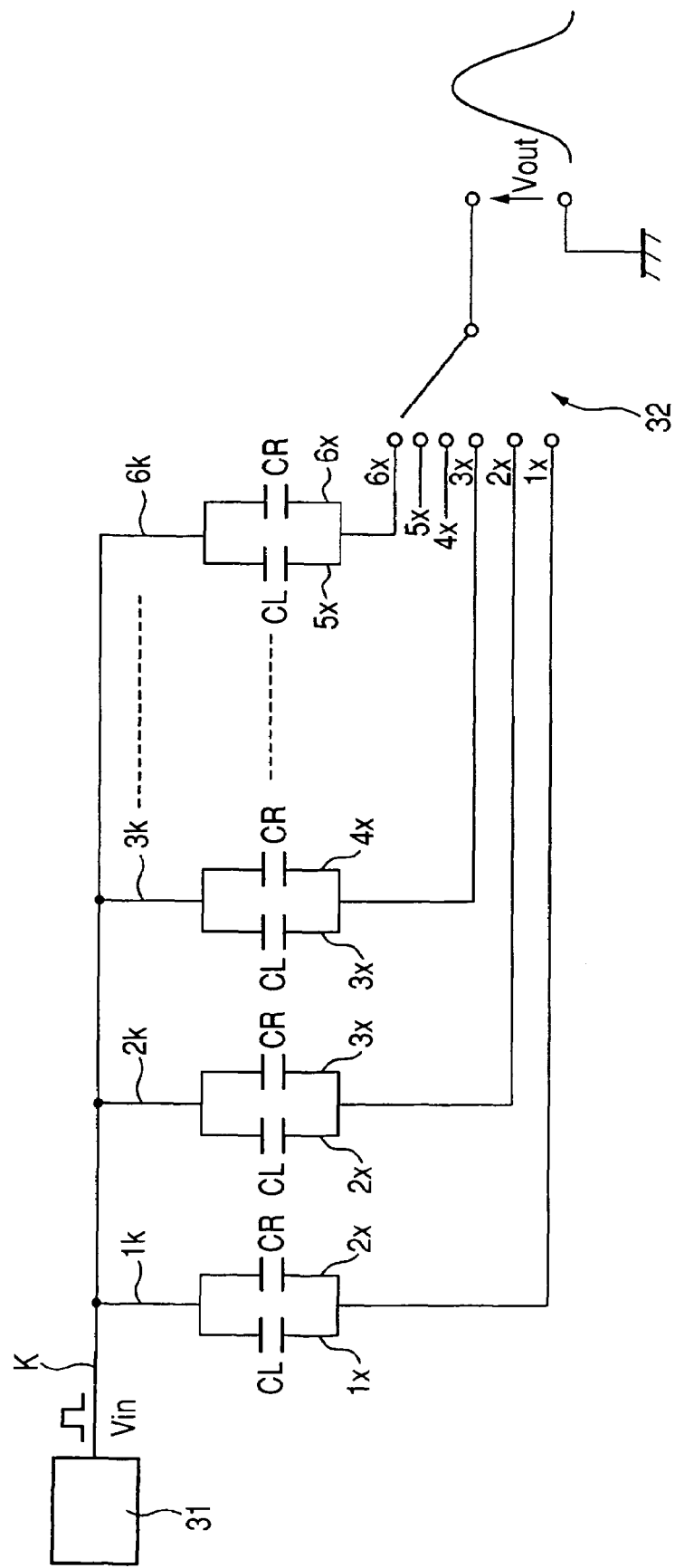
Figure 9:
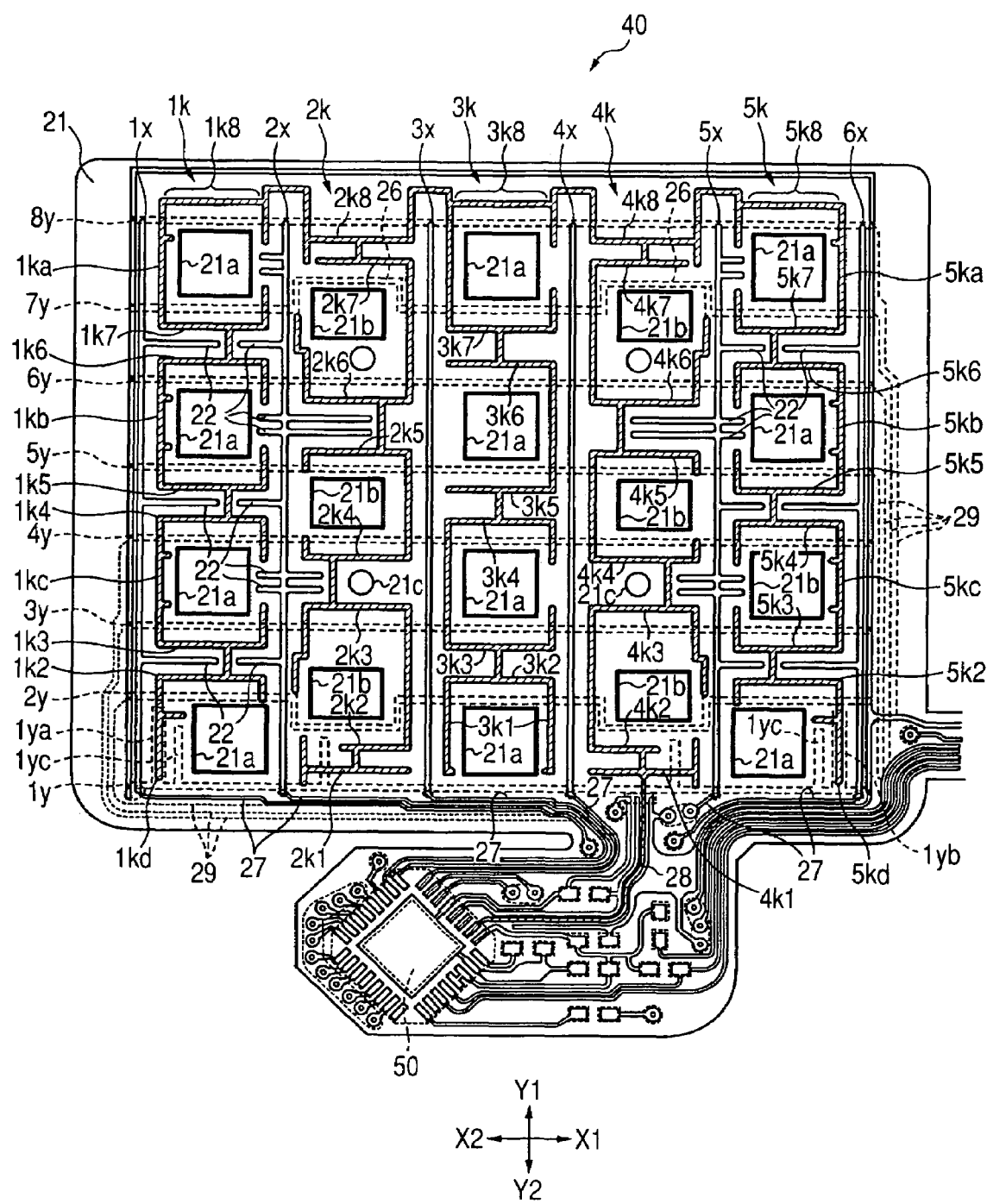
Figure 10A:
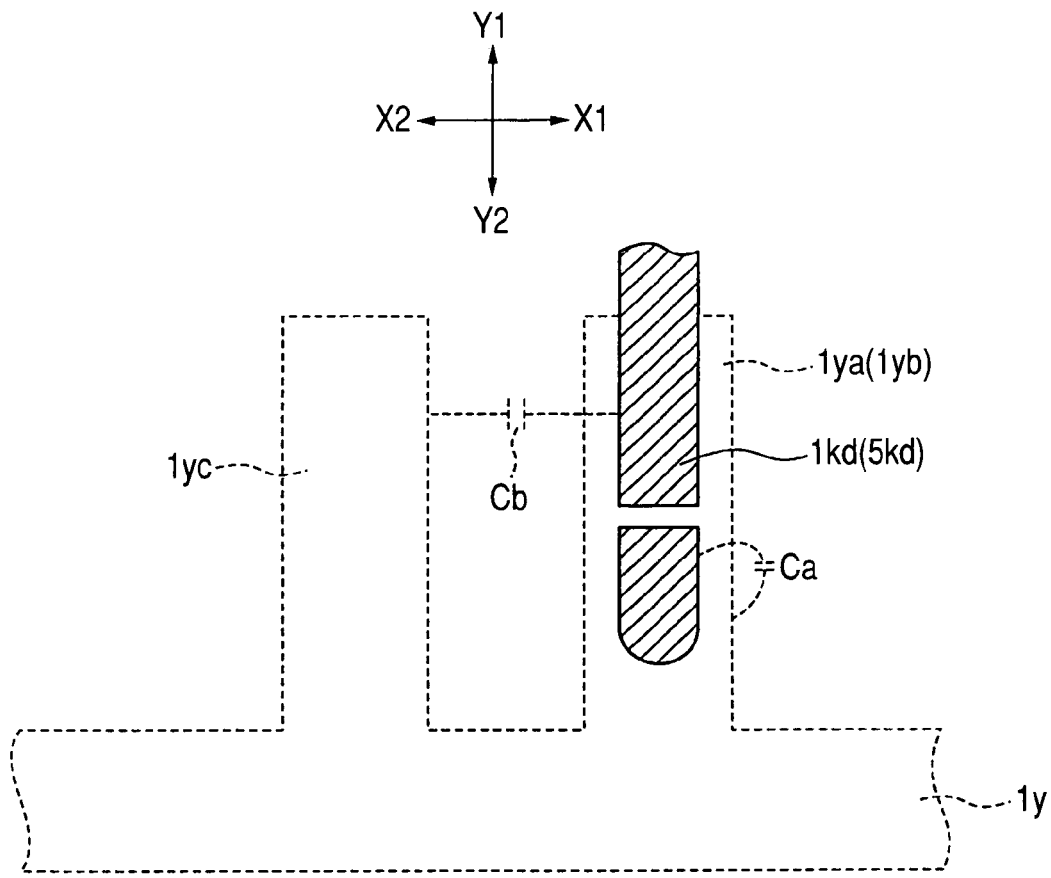

FIG. 6 is an enlarged plan view of a common electrode serving as a reference and two X detection electrodes adjacent to the common electrode;

FIG. 7 is an enlarged plan view illustrating a relationship between common branch electrodes provided in a common electrode serving as a reference and parallel electrodes provided in X detection electrodes adjacent to each other;

FIG. 8 is a conceptual view illustrating the structure of an equivalent circuit of the X detection electrode side and a voltage detection unit thereof;

FIG. 9 is a plan view of a base sheet and electrode patterns constituting a coordinate detection device according to a second embodiment of the present invention;

FIG. 10A is a partial enlarged plan view of the device shown in FIG. 9; and

Figure 10B:
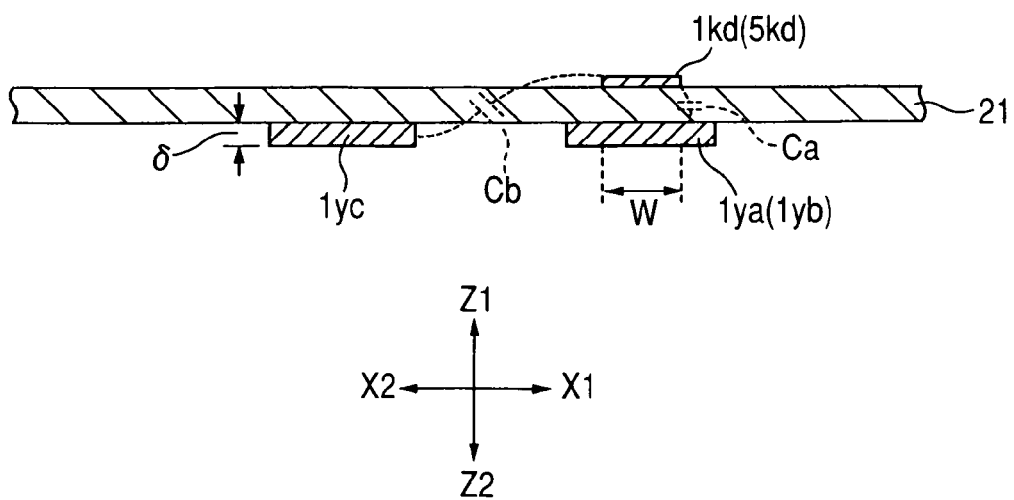

FIG. 10B is a cross-sectional view of the device shown in FIG. 10A.

DESCRIPTION OF THE PREFERRED EMBODIMENT

Preferred embodiments of the present invention will now be described with reference to the drawings.

Figure 1:
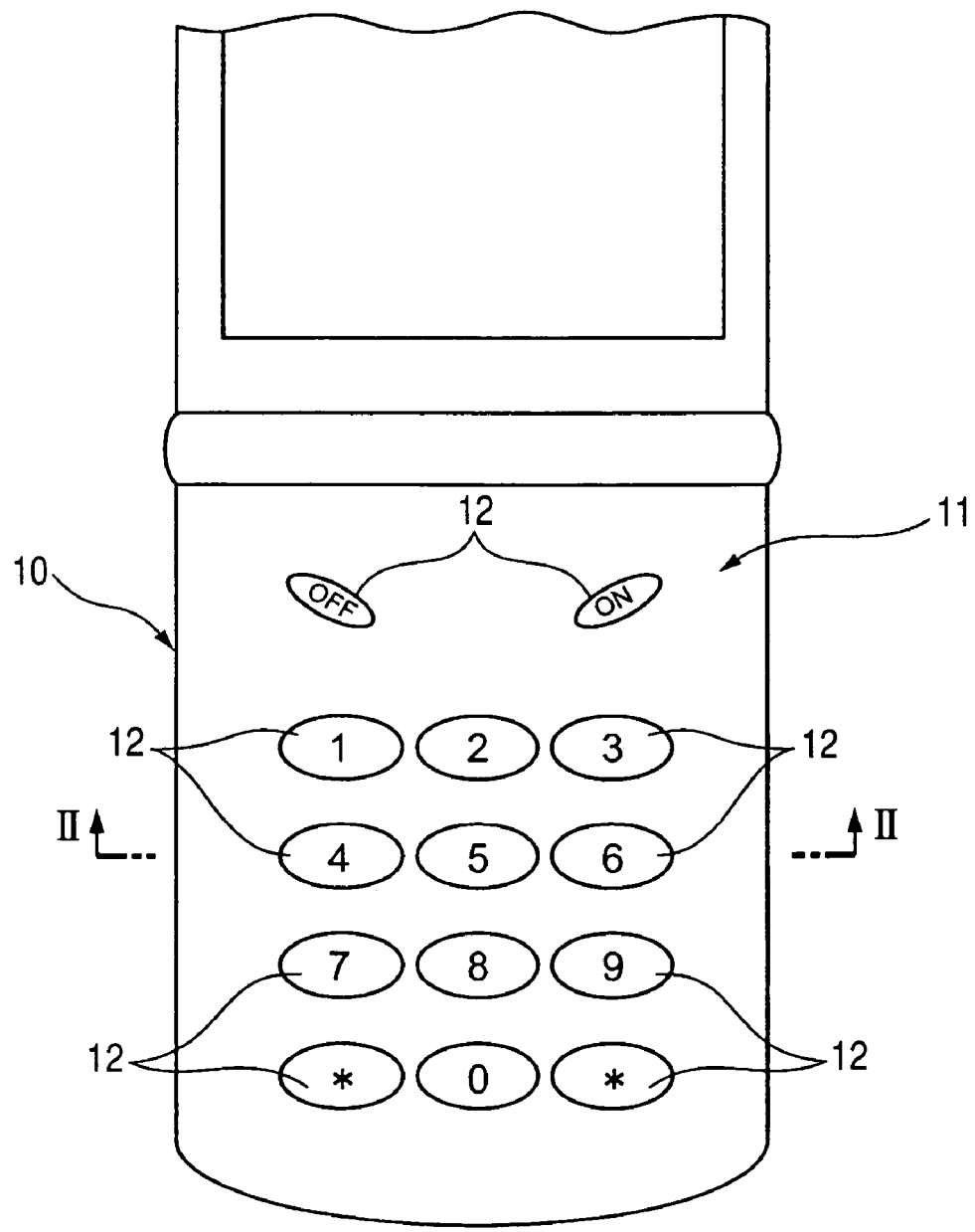
FIG. 1 is a plan view of a cellular phone as an information terminal apparatus having a coordinate detection device according to the present invention mounted therein.
Figure 1:
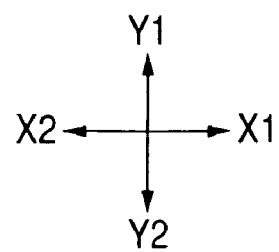
Figure 2:
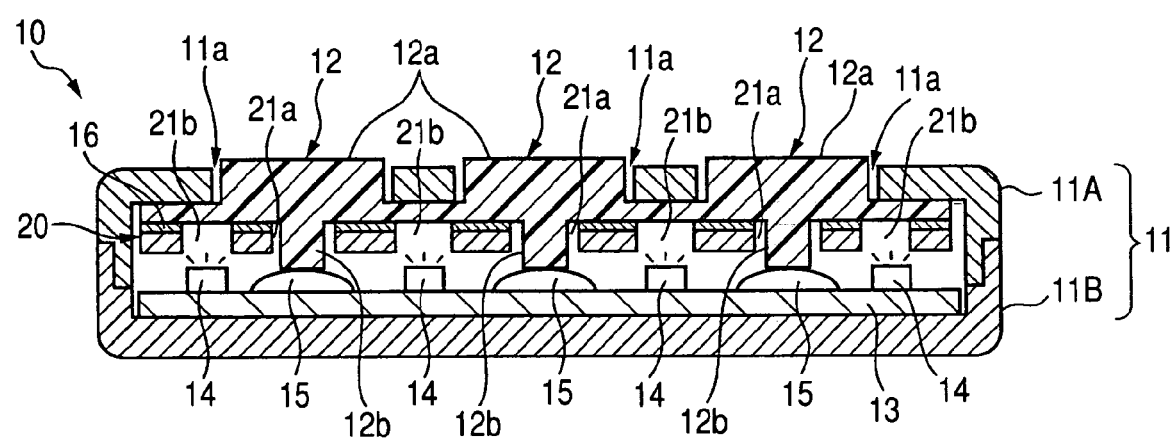
FIG. 2 is cross-sectional view of the cellular phone taken along the line II-II of FIG. 1.
Figure 3:
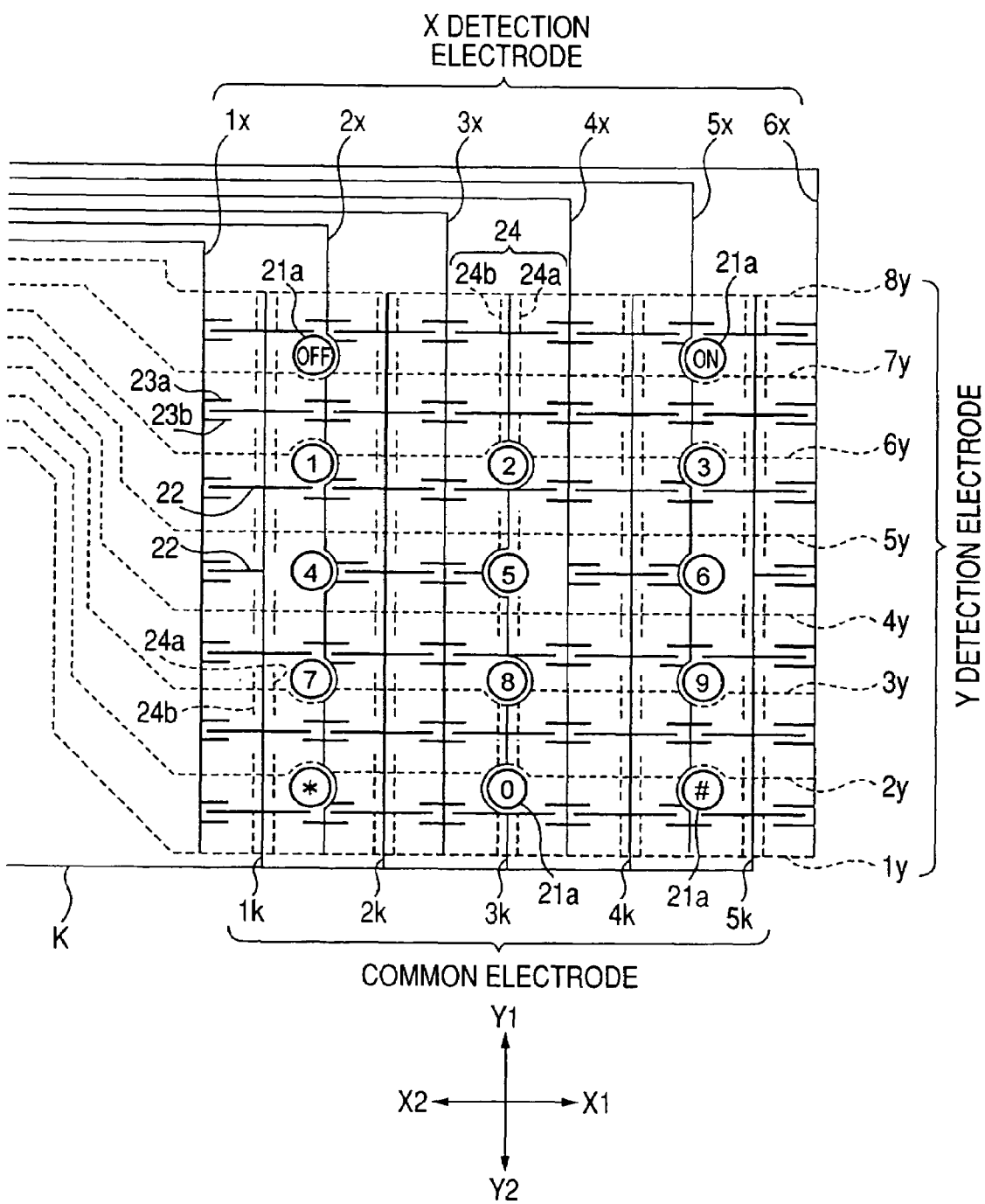
FIG. 3 is a plan view of a base sheet and electrode patterns constituting a coordinate detection device according to a first embodiment of the present invention.
Figure 4:
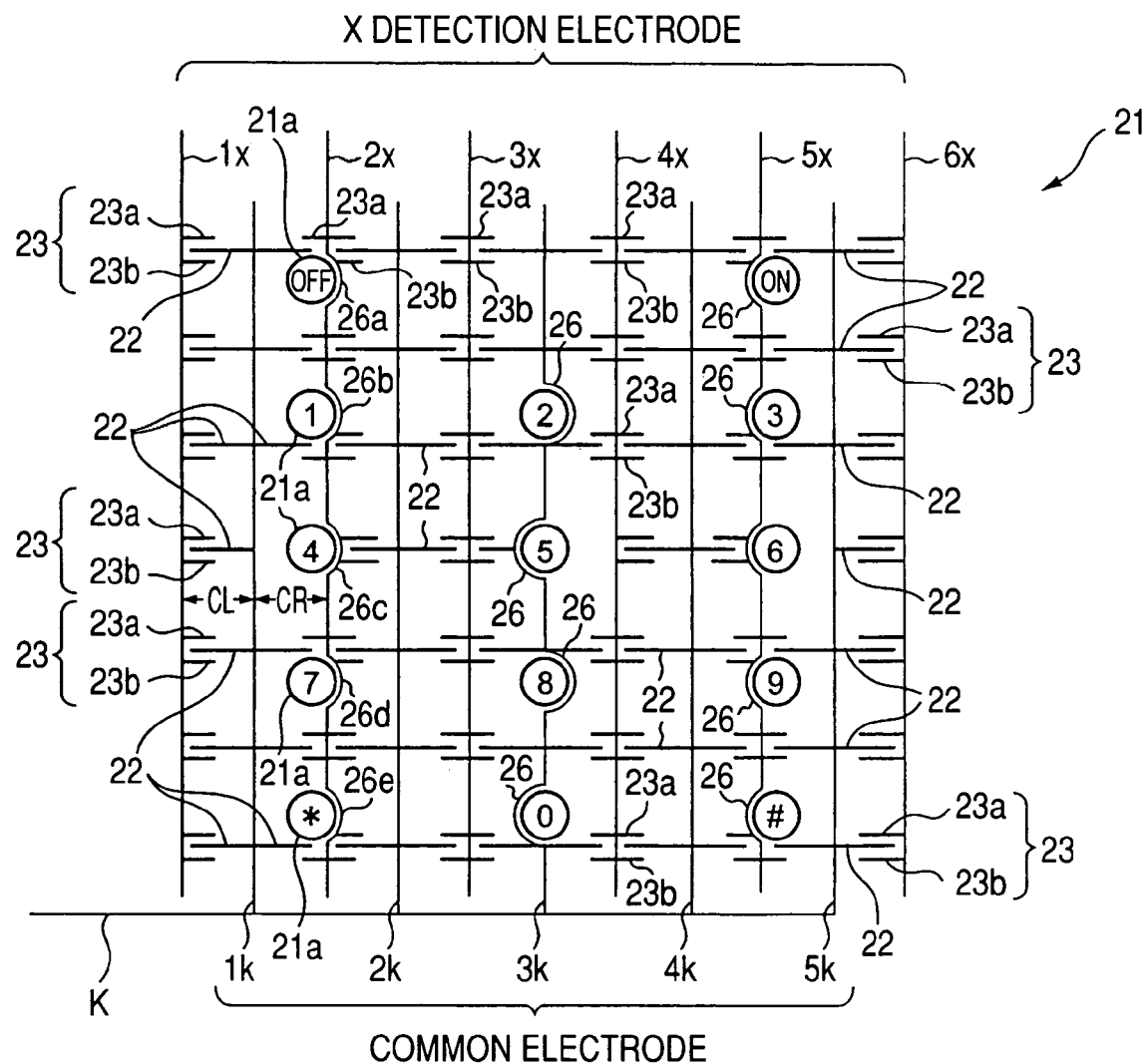
FIG. 4 is a plan view of X detection electrodes and a common electrode formed on one surface of the base sheet of FIG. 3.
Figure 5:
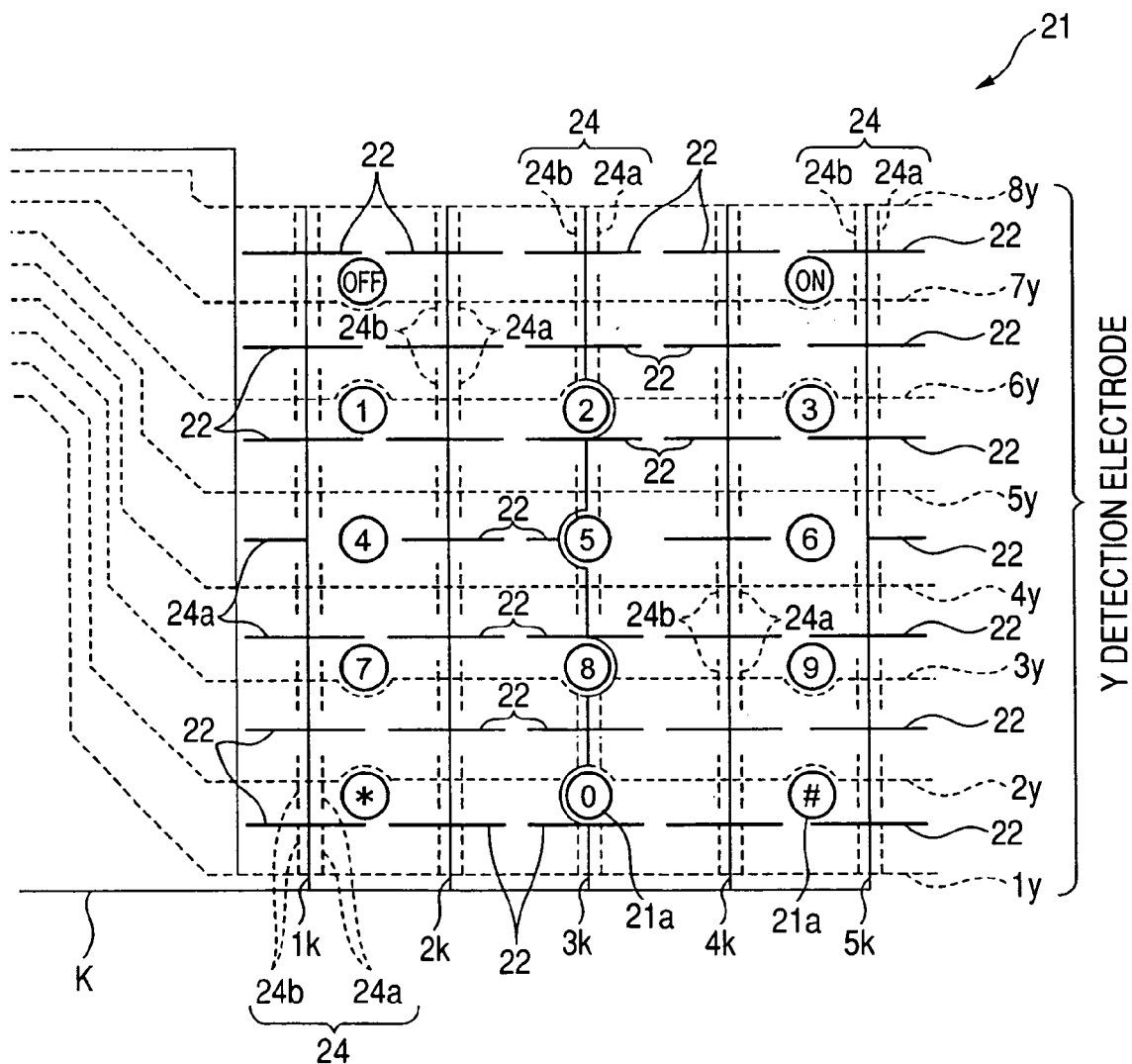
FIG. 5 is a plan view of a case in which the common electrode formed on one surface of the base sheet of FIG. 3 and the Y detection electrodes formed on the other surface of the base sheet of FIG. 3 are viewed from the same direction as FIG. 4.

FIG. 1 is a plan view of a cellular phone as an information terminal apparatus in which a coordinate detection device according to the present invention is mounted. FIG. 2 is a cross-sectional view of the cellular phone taken along the line II-II of FIG. 1. FIG. 3 is a plan view of a base sheet and electrode patterns constituting a coordinate detection device according to a first embodiment of the present invention. FIG. 4 is a plan view of X detection electrodes and common electrodes formed on one surface of the base sheet of FIG. 3. FIG. 5 is a plan view of a case in which the common electrode formed on one surface of the base sheet of FIG. 3 and the Y detection electrodes formed on the other surface of the base sheet of FIG. 3 are viewed from the same direction as FIG. 4. Further, in FIGS. 3 to 5, only insertion holes 21a through which stems 12b pass are shown, but passage holes 21b through which light is transmitted are omitted.

FIG. 1 shows an operation unit 11 of a cellular phone 10 generally as an information terminal apparatus. As shown in FIG. 1, a plurality of operation keys (operation members) 12 having typical key arrangement is arranged in the operation unit 11. As shown in FIG. 2, the operation unit 11 has an upper case 11A and a lower case 11B, which are integrally combined. A plurality of aperture holes 11a, 11a, . . . , and 11a are formed in the upper case 11A. Further, key tops 12a which are surfaces of the operation keys 12 are exposed from the aperture holes 11a, 11a, . . . , and 11a toward the outside. Characters, symbols, figures or the like are printed in the key tops 12a.

The operation keys 12 are formed of a transparent or translucent synthetic resin. For example, each of the operation keys 12 is formed as a keymat integrally connected through a hoop portion (not shown). Accordingly, each of the operation keys 12 is connected to the keymat becoming the body side in a state in which it is resiliently deformed in a Z1-Z2 direction through the hoop portion. A stem (compression convex portion) 12b having a columnar shape integrally projects on the rear surface of each of the operation keys 12 (a surface of the Z2 side), and extends in a direction (the Z2 direction) toward the inside of the device.

To the lower case 11B is fixed a circuit board 13. A plurality of electronic components 15 and light sources 14 are disposed on the circuit board 13. A front end of the stem 12b of each of the operation keys 12 is disposed opposite to each of the electronic components 15.

Each of the electronic components 15 has a metallic reversion plate having a dome shape and a contact electrode. A base end of the reversion plate is fixed to a ring-shaped electrode disposed in the circuit board 13, and the inner surface of the reversion plate is opposite to the contact electrode. As the inner surface of the reversion plate is brought into contact with the contact electrode due to the reversion of the reversion plate, the reversion plate serves as a switch that makes the contact electrode and the ring-shaped electrode electrically connected. Furthermore, the light sources 14 can be composed of LEDs or the like, and are disposed around the electronic components 15.

As shown in FIG. 2, a coordinate detection device 20 is disposed within the operation unit 11. The coordinate detection device 20 is fixed on the bottom surface of the keymat by means of an adhesive 16.

The coordinate detection device 20 includes a base sheet 21 having superior flexibility and a film shape. The base sheet 21 is preferably formed of a dielectric. As shown in FIG. 4, a plurality of X detection electrodes $1x$, $2x$, $3x$, $4x$, $5x$ and $6x$, which extend in the Y direction and are disposed in an X direction with a predetermined distance therebetween, and a plurality of common electrodes $1k$ $2k$, $3k$, $4k$ and $5k$, which extend in the Y direction, and are disposed between the X detection electrodes, respectively, in the X direction with a predetermined distance therebetween, are provided on one surface of the base sheet 21 such that they are not brought into contact with each other. The common electrodes $1k$, $2k$, $3k$, $4k$ and $5k$ are connected to each other at the end of the Y2 side, and are led to the outside of the base sheet 21 as a common electrode K.

Furthermore, as indicated by a dotted line in FIG. 5, a plurality of Y detection electrodes $1y$, $2y$, $3y$, $4y$, $5y$, $6y$, $7y$ and $8y$, which extend in the X direction and are disposed in the Y direction with a predetermined distance therebetween, are disposed on the other surface of the base sheet 21. Further, in FIG. 5, the common electrodes $1k$, $2k$, $3k$, $4k$ and $5k$ disposed on one surface of the base sheet 21 are indicated by a solid line.

The plurality of X detection electrodes $1x$, $2x$, $3x$, $4x$, $5x$ and $6x$ disposed on one surface of the base sheet 21, and the plurality of Y detection electrodes $1y$, $2y$, $3y$, $4y$, $5y$, $6y$, $7y$ and $8y$ disposed on the other surface of the base sheet 21 are disposed to cross at right angles to each other at both sides of the base sheet 21.

As shown in FIGS. 4 and 5, a plurality of common branch electrodes 22 extending toward both sides of the X direction in a straight line at a predetermined length are formed in the common electrodes $1k$, $2k$, $3k$, $4k$ and $5k$. The common branch electrodes 22 are disposed to cross the common electrodes $1k$, $2k$, $3k$, $4k$ and $5k$ in the Y direction with a predetermined distance therebetween. The front ends of both directions (X1 and X2 directions) basically extend up to a position immediately before they cross the X detection electrodes $1x$, $2x$, $3x$, $4x$, $5x$ and $6x$.

As shown in FIG. 4, a plurality of first auxiliary electrodes 23 that extend parallel to each other at both sides of the X direction are formed in the X detection electrodes $1x$, $2x$, $3x$, $4x$, $5x$ and $6x$, respectively. Each of the first auxiliary electrodes 23 basically includes a pair of parallel electrodes $23a$ and $23b$, and is disposed to cross each of the X detection electrodes $1x$, $2x$, $3x$, $4x$, $5x$ and $6x$ in the Y direction at a predetermined distance. Furthermore, the front end of each of the common branch electrodes 22 is inserted between each parallel electrode 23a at one side and each parallel electrode 23b at the other side, which form each of the first auxiliary electrodes 23. The front end of each of the common branch electrodes 22 is disposed partially opposite to the parallel electrodes 23a and 23b.

Furthermore, as shown in FIG. 5, second auxiliary electrodes 24 extending parallel to each other at both sides of the Y direction are formed in the Y detection electrodes 1y, 2y, 3y, 4y, 5y, 6y, 7y and 8y, respectively. Each of the second auxiliary electrodes 24 also basically has a pair of parallel electrodes 24a and 24b, and is disposed to cross each of the Y detection electrodes 1y, 2y, 3y, 4y, 5y, 6y, 7y and 8y in the X direction with a predetermined distance therebetween. As shown in FIG. 5, the common electrodes 1k, 2k, 3k, 4k and 5k disposed on the other surface of the base sheet 21 are disposed between the parallel electrodes 24a on one side and the parallel electrodes 24b on the other side, which are disposed on the other surface of the base sheet 21, and form the second auxiliary electrodes 24.

Further, in the coordinate detection device 20, a front sheet (not shown) covering the X detection electrodes and the common electrodes is laminated on one surface of the base sheet 21 in which the X detection electrodes and the common electrodes shown in FIG. 4 are provided. Furthermore, a rear sheet (not shown) covering the Y detection electrodes is laminated on the other surface of the base sheet 21 in which the Y detection electrodes shown in FIG. 5 are provided.

Further, when the base sheet 21 is formed of a dielectric, the front sheet and the rear sheet are preferably transparent insulation sheets. Furthermore, when the base sheet 21 is not formed of a dielectric, the front sheet and the rear sheet are preferably transparent sheets having the dielectric property.

As shown in FIG. 2, the insertion holes 21a through which the stems 12b pass, or the passage holes 21b serving as a passage that guides light emitted from the light sources 14 to the rear surface of the operation keys 12 are formed in the base sheet 21 (this is also applied to the front sheet and the rear sheet). Accordingly, if the operation keys 12 are pressed, the stems 12b can reverse the reversion plate of the electronic components 15, thereby giving a pleasant feeling of clicking to an operator.

Furthermore, since light emitted from the light sources 14 can pass through the passage holes 21b as a passage, the light can brightly shine the rear surfaces of the keys (the operation members) 12. In this case, if the light sources 14 for illumination are disposed opposite to the passage holes 21b formed in the base sheet 21, the characters, symbols, figures or the like which are printed in the key tops 12a can be clearly seen even in the dark.

Hereinafter, the operation of the coordinate detection device will be described.

The operation of the coordinate detection device in the case in which only the common electrode K, the common branch electrodes 22, the X detection electrodes and the Y detection electrodes are provided, that is, the case in which the first auxiliary electrodes 23 and the second auxiliary electrodes 24 are not provided will be first described.

FIG. 6 is an enlarged plan view of a common electrode serving as a reference and two X detection electrodes adjacent to the common electrode. FIG. 7 is an enlarged plan view of the relationship between the common branch electrodes provided in the common electrode serving as the reference and the parallel electrodes provided in the X detection electrodes adjacent to each other.

As shown in FIG. 6, if any one of the plurality of common electrodes 1k, 2k, 3k, 4k and 5k, for example, the common electrode 3k is set as a reference common electrode, the X detection electrode disposed at one side adjacent to the reference common electrode 3k (for example, the right side) becomes 4x, and the X detection electrode disposed at the other side adjacent to the reference common electrode 3k (for example, the left side) becomes 3x.

A capacitance C1 is coupled between the reference common electrode 3k and the X detection electrode 3x, and a capacitance C2 is coupled between the reference common electrode 3k and the X detection electrode 4x. For this reason, if a voltage Vin of a pulse form is applied to the reference common electrode 3k through an oscillation unit (not shown), the X detection electrode 3x is applied with the voltage Vin through the capacitance C1, and the X detection electrode 4x is applied with the voltage Vin through the capacitance C2.

Further, if a distance d between the reference common electrode 3k and the X detection electrode 3x and an opposite length between the electrodes are the same as a distance d between the reference common electrode 3k and the X detection electrode 4x and an opposite length between the electrodes, respectively, both capacitances become C1=C2 and a balance is adjusted between the electrodes.

In this state, if a contact body serving as a conductor comes into contact with or approaches the front sheet in a state in which a finger or the like is grounded on the front sheet covering the reference common electrode 3k, a portion of dielectric flux generated between the reference common electrode 3k and the X detection electrodes 3x and 4x is extracted toward the contact body, thereby reducing the capacitances C1 and C2. Accordingly, a detection voltage Vout depending on variations in the capacitances C1 and C2 is output from the X detection electrodes 3x and 4x. The detection voltage Vout is output as a low voltage value as much as the distance between the contact body and the X detection electrodes is close. That is, voltage values output from the X detection electrodes 3x and 4x are smallest, and voltage values output from the X detection electrodes 1x, 2x and 5x other than the X detection electrodes 3x and 4x are large. Therefore, it is possible to determine a coordinate position of the contact body in the X direction by sequentially detecting voltage values of the X detection electrodes 1x, 2x, 3x, 4x, 5x and 6x at a predetermined cycle.

Meanwhile, in FIGS. 3 to 5, seven columns of the plurality of common branch electrodes 22 extending in the X direction are formed in the common electrodes 1k, 2k, 3k, 4k and 5k in the Y direction at a predetermined pitch. That is, one set of the common branch electrodes 22 arranged in a row in the X direction is formed seven in number. The seven sets of the common branch electrodes 22 arranged in the Y direction at a predetermined pitch and the Y detection electrodes 1y, 2y, 3y, 4y, 5y, 6y, 7y and 8y provided between them are opposite to each other.

If one of the seven sets of the common branch electrodes 22 is set as a reference common electrode, capacitances C1 and C2 are formed between the reference common electrode and two Y detection electrodes adjacent in the Y direction, in the same manner as the above. Accordingly, in the same manner as the X detection electrodes, if a pulse voltage Vin of a predetermined cycle is applied to the common electrode K and a detection voltage Vout output from the Y detection electrodes 1y, 2y, 3y, 4y, 5y, 6y, 7y and 8y is sequentially detected at a predetermined cycle, a coordinate position of the contact body in the Y direction can be determined.

Furthermore, the coordinate detection device 20 is adapted such that coordinate information of the contact body can be input to the cellular phone 10 by acquiring a coordinate position of the X direction and a coordinate position of the Y direction.

As shown in FIG. 2, however, the insertion holes 21a through which the stems 12b pass, or the passage holes 21b servings as a passage that guides light emitted from the light sources 14 to the rear surfaces of the operation keys 14 are formed in the base sheet 21 (this is also applied to the front sheet and the rear sheet). For this reason, since the common electrodes, the common branch electrodes 22, the X detection electrodes and the Y detection electrodes cannot be formed in a straight line on the base sheet 21, detours 26 for avoiding the insertion holes 21a are partially formed.

However, if the partial detours are formed in the common electrodes 1k, 2k, 3k, 4k and 5k the common branch electrodes 22, the X detection electrodes and the Y detection electrodes, each capacitance between the common electrodes 1k, 2k, 3k, 4k and 5k and the X detection electrodes 1x, 2x, 3x, 4x, 5x and 6x adjacent to the common electrodes, and each capacitance between the seven sets of the common branch electrodes 22 arranged in the Y direction at a predetermined pitch and the Y detection electrodes 1y, 2y, 3y, 4y, 5y, 6y, 7y and 8y adjacent to the common branch electrodes are different from each other due to a difference in the distance between the electrodes. In other words, the capacitances C1 and C2 formed between the reference common electrode and the X detection electrodes (or the Y detection electrodes) adjacent to the reference common electrode does not have a predetermined value, which makes it impossible to correctly detect X coordinates and Y coordinates of the contact body based on voltage values detected from the X detection electrodes or the Y detection electrodes.

In view of the above, in the present invention, the plurality of first auxiliary electrodes 23 are formed in the X detection electrodes 1x, 2x, 3x, 4x, 5x and 6x, and the plurality of second auxiliary electrodes 24 are formed in the Y detection electrodes 1y, 2y, 3y, 4y, 5y, 6y, 7y and 8y, as described above. The operation thereof will be described below.

As shown in FIG. 7, it is assumed that one of the plurality of common electrodes 1k, 2k, 3k, 4k and 5k is a reference common electrode BK, an X detection electrode located at one side of the reference common electrode BK (for example, the right side), which is adjacent to the reference common electrode BK, is a first detection electrode XR, and an X detection electrode located at the other side of the reference common electrode BK (for example, the left side) is a second detection electrode XL. Further, the first detection electrode XR and the second detection electrode XL are any two of the X detection electrodes 1x, 2x, 3x, 4x, 5x and 6x, which are adjacent to each other.

Furthermore, a place where the front end of the common branch electrode 22 extending from the reference common electrode BK in an X1 direction is disposed in an opposite way between a pair of parallel electrodes (first auxiliary electrodes) 23a and 23b, which extend from the first detection electrode XR in an X2 direction, is set as a first capacitance adjustment unit 25A. Likewise, a place where the front end of the common branch electrode 22 extending from the reference common electrode BK in the X2 direction is disposed in an opposite way between a pair of parallel electrodes (second auxiliary electrodes) 23a and 23b, which extend from the second detection electrode XL in the X1 direction, is set as a second capacitance adjustment unit 25B.

Assuming that a length (an opposite length) of a portion where the parallel electrodes 23a and 23b and the common branch electrode 22 in the first and second auxiliary electrodes are opposite to each other is L, a distance between the parallel electrodes 23a and 23b and the common branch electrode 22 is d, a dielectric constant of the base sheet 21 is ∈, and a film thickness of each electrode in a Z direction is d (not shown), a capacitance $C_A$ in the first capacitance adjustment unit 25A can be expressed in the following Equation 1.

$$C_A = \varepsilon \frac{S}{d} = \varepsilon \frac{L \cdot \delta}{d} \quad \text{[Equation 1]}$$

where S=L·δ

In the same manner, a capacitance $C_B$ in the second capacitance adjustment unit 25B can be expressed in the following Equation 2.

$$C_B = \varepsilon \frac{S}{d} = \varepsilon \frac{L \cdot \delta}{d} \quad \text{[Equation 2]}$$

where S=L·δ

The dielectric constant ∈ and the film thickness d of each of the electrodes can be considered as predetermined values. As a result, the capacitances $C_A$ and $C_B$ are proportional to the opposite length L between the electrodes.

Furthermore, the first and second capacitance adjustment units 25A and 25B are provided in plural at both sides (the left and right sides) of one reference common electrode BK (although there are seven places in each of the examples shown in FIGS. 3 to 5, n places are provided in this case). Furthermore, assuming that a capacitance originally existing between the reference common electrode BK and the first detection electrode XR is C1 and a capacitance originally existing between the reference common electrode BK and the second detection electrode XL is C2, a composite capacitance CR between the reference common electrode BK and the first detection electrode XR is CR=C1+n·$C_A$ because the capacitance C1 and the capacitance $C_A$ formed at the n places of the first capacitance adjustment units 25A are equivalent to that they are connected parallel to each other. In the same manner, a composite capacitance CL between the reference common electrode BK and the second detection electrode XL is CL=C2+n·$C_B$ because the capacitance C2 and capacitance $C_B$ formed at the n places of the second capacitance adjustment units 25B are equivalent to that they are connected parallel to each other.

In the case in which the detection voltage Vout is obtained from the X detection electrodes 1x, 2x, 3x, 4x, 5x and 6x by applying a predetermined voltage Vin to the common electrodes 1k, 2k, 3k, 4k and 5k the voltage Vin is applied to one X detection electrode from two common electrodes located at both sides of the X detection electrode. For example, if a voltage is to be detected from the X detection electrode 2x, the voltage Vin is applied to the X detection electrode 2x from both the common electrode 1k and the common electrode 2k which are adjacent to each other to the X detection electrode 2x. A composite capacitance C for the X detection electrode 2x becomes a value (C=C1+C2) that the capacitance C1 between the common electrode 1k and the X detection electrode 2x and the capacitance C2 between the common electrode 2k and the X detection electrode 2x are connected parallel to each other.

Accordingly, a comprehensive composite capacitance C between the reference common electrode BK, and the first and second detection electrodes XR and XL can be expressed into the following Equation 3.

$$C=CL+CR=(C1+n \cdot C_A)+(C2+n \cdot C_B)=(C1+C2)+n \cdot (C_A+C_B) \quad \text{[Equation 3]}$$

That is, by forming the plurality of first and second capacitance adjustment units 25A and 25B, electrostatic coupling between the reference common electrode BK and the first and second detection electrodes XR and XL are increased to increase the comprehensive composite capacitance C. It is thus possible to increase variations in a capacitance when the contact body approaches. For this reason, variations in voltage values detected from the X detection electrode and the Y detection electrode can be surely captured. Therefore, detection accuracy of the coordinate detection device can be increased.

In addition, since Equation 3 has a capacitance value corresponding to $n \cdot (C_A + C_B)$, the comprehensive composite capacitance C can be widely adjusted. That is, since a capacitance corresponding to $n \cdot (C_A + C_B)$ is formed by the plurality of first and second capacitance adjustment units 25A and 25B, variations in the comprehensive composite capacitance C can be kept low, that is, the composite capacitance C formed between the electrodes can be kept constant by properly controlling the capacitance.

An example of the method of controlling the composite capacitance C will now be described.

The state having the relationship shown in FIG. 7, that is, a case in which the capacitance C1 between the original reference common electrode BK and the first detection electrode XR and the capacitance C2 between the original reference common electrode BK and the second detection electrode XL are the same (C1=C2), and the capacitance $n \cdot C_A$ of the plurality of first capacitance adjustment units 25A and the capacitance $n \cdot C_B$ of the plurality of second capacitance adjustment units 25B are the same ($n \cdot C_A = n \cdot C_B$) (CL(=C1+$n \cdot C_A$)=CR(=C2+$n \cdot C_B$)) is set to a reference state in which a balance control is sustained. Further, the comprehensive composite capacitance C in the reference state becomes Equation 3.

Hereinafter, a case where the common electrode 1k is the reference common electrode BK, the X detection electrode 2x located at the X1 side is the first detection electrode XR, and the X detection electrode 1x located at the X2 side is the second detection electrode XL will be described with reference to FIG. 4.

As shown in FIG. 4, five insertion holes 21a into which the stems 12b of the operation keys 12 having characters such as 'OFF', '1', '4', '7' and '*' printed therein are inserted are formed in the middle of the Y direction where the X detection electrode 2x extends at a predetermined pitch. Furthermore, five detours 26 (indicated by reference numerals 26a, 26b, 26c, 26d and 26e, respectively) that form the X detection electrode 2x are formed at the sides of the insertion holes 21a. Each of the detours 26 has an approximately circular arc shape in order to avoid the insertion hole 21a. All the detours 26 projects in a concave shape in the X1 direction when viewed from the common electrode 1k serving as the reference common electrode BK. Furthermore, most of the plurality of first capacitance adjustment units 25A, which are adjacent to the insertion holes 21a, respectively, and provided at the right side of the first detection electrode XR (the X detection electrode 2x), are in a state where one of or the parallel electrodes 23a and 23b cannot extend in the X2 direction.

For this reason, the original capacitance C1 and the capacitance $n \cdot C_A$ formed by the plurality of first capacitance adjustment units 25A are all small between the common electrodes 1k serving as the reference common electrode BK and the X detection electrode 2x serving as the first detection electrode XR located at the X1 side. The composite capacitance CR between the common electrodes 1k and the X detection electrode 2x becomes smaller than the reference state.

Meanwhile, the common electrode 1k and the X detection electrode 1x are maintained with a predetermined distance therebetween between the common electrode 1k serving as the reference common electrode BK and the X detection electrode 1x serving as the second detection electrode XL located at the X1 side. Therefore, the original capacitance C1 between them is almost the same as that of the reference state. However, the length of the parallel electrodes 23a and 23b that extend from the X detection electrode 1x in the X1 direction is larger than that in the reference state, but is smaller than an opposite length L between the parallel electrodes 23a and 23b and the common branch electrode 22.

That is, the capacitance $n \cdot C_B$ formed by the plurality of second capacitance adjustment units 25B is large between the common electrode 1k serving as the reference common electrode BK and the second detection electrode XL. The composite capacitance CL between the common electrode 1k and the second detection electrode XL is larger than that in the reference state.

Furthermore, the comprehensive composite capacitance C=CR+CL is set to be the same as that of the reference state. That is, a reduction amount of the composite capacitance CR at one side, which is the right side for the reference common electrode BK, is supplemented by the composite capacitance CL at the other side, which is the left side for the reference common electrode BK. Therefore, the comprehensive composite capacitance (the composite capacitance between the reference common electrode BK and the first and second detection electrodes XR and XL) C is kept to a predetermined value.

Furthermore, four insertion holes 21a into which the stems 12b of the operation keys 12 having characters such as '2', '5', '8' and '0' printed therein are inserted are formed at a predetermined pitch in the middle of the Y direction where the common electrode 3k extends. However, the comprehensive composite capacitance (the composite capacitance between the reference common electrode BK and the first and second detection electrodes XR and XL) C can be kept constant so as to be the same as that of the reference state in such a manner that a reduction amount or an increased amount of the composite capacitance CR between the common electrode 3k and the X detection electrode 4x at one side is supplemented by the composite capacitance CL between the common electrode 3k and the X detection electrode 3x at the other side, by performing the same process as the above.

As such, in the present invention, if one of the composite capacitance CR between the reference common electrode BK and the first detection electrode XR adjacent to one side of the reference common electrode BK, and the composite capacitance CL between the reference common electrode BK and the second detection electrode XL adjacent to the other side of the reference common electrode BK is reduced, the other of the two composite capacitances is increased, or if one of the two composite capacitances is increased, the other of the two composite capacitances is reduced. As such, the plurality of first capacitance adjustment units 25A and second capacitance adjustment units 25B, which form the capacitances $n \cdot C_A$ and $n \cdot C_B$, is controlled such that the comprehensive composite capacitance C(=CL+CR) is always kept constant as a whole. In other words, each electrode pattern is formed such that the composite capacitance CL at one side can supplement a decrease or an increase of the composite capacitance CR at the other side.

Further, according to the above-mentioned construction, the same process is also performed between the seven sets of the common branch electrodes 22 arranged in the Y direction at a predetermined pitch and the Y detection electrodes 1y, 2y, 3y, 4y, 5y, 6y, 7y and 8y.

For this reason, in the coordinate detection device 20 according to the present invention, even through holes are formed in the base sheet and respective electrodes cannot be provided in a straight line, a capacitance between the common electrode K and each of the X detection electrodes or each of the Y detection electrodes can be kept constant regardless of places. Accordingly, when a contact body such as a finger, which is in ground state, is brought into contact with or approaches the surface of the coordinate detection device 20, a coordinate position of a X direction, which the contact body is brought into contact with or approaches, can be detected with high accuracy.

FIG. 8 is a conceptual view illustrating the structure of an equivalent circuit at the X detection electrode side and a voltage detection unit thereof.

In the voltage detection unit shown in FIG. 8, if a predetermined voltage Vin is applied to the common electrode K using an oscillation unit 31 that can oscillate the voltage Vin having a predetermined frequency, a detection voltage Vout according to the composite capacitances CR and CL is output to each of the X detection electrodes 1x, 2x, 3x, 4x, 5x and 6x. Accordingly, while sequentially selecting the X detection electrodes 1x, 2x, 3x, 4x, 5x and 6x at predetermined sampling cycle using a multiplexer 32, each detection voltage Vout output to each of the X detection electrodes 1x, 2x, 3x, 4x, 5x and 6x can be obtained with high accuracy by means of an A/D conversion unit (not shown).

In the above-mentioned embodiment, it has been described that the voltage Vin is applied to the common electrode K and the detection voltage Vout is detected from the X detection electrodes 1x, 2x, 3x, 4x, 5x and 6x, but the present invention is not limited thereto. The voltage Vin can be applied to the X detection electrodes 1x, 2x, 3x, 4x, 5x and 6x, and the detection voltage Vout can be detected from the common electrode K.

Furthermore, in the above-mentioned embodiment, it has been described that electrode patterns formed on one surface of the base sheet 21 are set to a common electrode and X detection electrodes, and electrode patterns formed on the other surface of the base sheet 21 are set to Y detection electrodes, but the present invention is not limited thereto. The electrode patterns formed on one surface of the base sheet 21 can be used as the common electrode and the Y detection electrodes, and the electrode patterns formed on the other surface of the base sheet 21 can be used as the X detection electrodes. In addition, the electrode patterns formed on one surface of the base sheet 21 can be used as the Y detection electrodes, and the electrode patterns formed on the other surface of the base sheet 21 can be used as the X detection electrodes. That is, the X detection electrodes and the Y detection electrodes can be replaced with each other.

Hereinafter, a case where a coordinate detection device 40 is disposed within the operation unit 11 as shown in FIG. 9 will be described.

FIG. 9 is a plan view of a base sheet 21 and electrode patterns constituting the coordinate detection device according to a second embodiment of the present invention. FIG. 10A is a partial enlarged plan view of the coordinate detection device shown in FIG. 9, and FIG. 10D is a cross-sectional view of the device shown in FIG. 10A. At this time, the coordinate detection device 40 is fixed on the bottom surface of the keymat by means of the adhesive 16.

Further, in FIG. 9, solid lines having no hatching indicate X detection electrodes 1x, 2x, 3x, 4x, 5x and 6x formed on one surface of the base sheet 21, and solid lines having hatching indicate common electrodes 1k, 2k, 3k, 4k and 5k formed on one surface of the base sheet 21. Furthermore, dotted lines indicate Y detection electrodes 1y, 2y, 3y, 4y, 5y, 6y, 7y and 8y formed on the other surface of the base sheet 21. Further, squares of a bold line indicate insertion holes 21a and rectangles of a bold line indicate passage holes 21b. Circular holes indicate mounting holes 21c in which the base sheet 21 is mounted.

The coordinate detection device 40 has the base sheet 21, which has superior flexibility and a film shape. Further, the base sheet 21 is formed of a dielectric. As shown in FIG. 9, the insertion holes 21a through which the stems 12b pass, or the passage holes 21b serving as a passage that guides light emitted from the light sources 14 to the rear surfaces of the operation keys 12 are formed in the base sheet 21. Accordingly, when the operation keys 12 are pressed, the stems 12b can reverse the reversion plate of electronic components 15. It can provide an operator with a pleasant feeling of clicking.

Furthermore, since light emitted from the light sources 14 can pass through the passage holes 21b using them as passages, it can brightly shine the rear surfaces of the keys (the operation members) 12. In this case, if the light sources 14 for illumination are disposed opposite to the passage holes 21b formed in the base sheet 21, the characters, symbols, figures or the like, which are printed in the key tops 12a, can be clearly seen even in the dark.

A plurality of the X detection electrodes 1x, 2x, 3x, 4x, 5x and 6x, which extend in the Y direction and are disposed in the X direction with a predetermined distance therebetween, are provided on one surface of the base sheet 21. Furthermore, a plurality of the common electrodes 1k, 2k, 3k, 4k and 5k (the common electrode K), which extend in the Y direction as a whole while avoiding the insertion holes 21a or the passage holes 21b formed in the base sheet 21, are disposed in the X direction with a predetermined gap interposed therebetween at locations where they are not brought into contact with the X detection electrodes 1x, 2x, 3x, 4x, 5x and 6x.

The common electrode 1k has common counter electrodes 1k2, 1k3, 1k4, 1k5, 1k6, 1k7 and 1k8, which extend in the Y direction and are partially opposite to the Y detection electrodes 1y, 2y, 3y, 4y, 5y, 6y, 7y and 8y, respectively, in a parallel way. The common electrode 1k extends from the left end in the Y direction. In the same manner, the common electrode 2k has common counter electrodes 2k1, 2k2, 2k3, 2k4, 2k5, 2k6, 2k7 and 2k8 that are partially opposite to the Y detection electrodes 1y to 8y, respectively, in a parallel way. In the same manner, the common electrode 3k has common counter electrodes 3k2, 3k3, 3k4, 3k5, 3k6, 3k7 and 3k8 that are partially opposite to the Y detection electrodes 1y to 8y, respectively, in a parallel way. Likewise, the common electrode 4k has common counter electrodes 4k1, 4k2, 4k3, 4k4, 4k5, 4k6, 4k7 and 4k8 that are partially opposite to the Y detection electrodes 1y to 8y, respectively, in a parallel way. In the same manner, the common electrode 5k has common counter electrodes 5k2, 5k3, 5k4, 5k5, 5k6, 5k7 and 5k8 that are partially opposite to the Y detection electrodes 1y to 8y, respectively, in a parallel way. The common electrodes 1k, 2k, 3k, 4k and 5k are connected to the common counter electrodes 1k8, 2k8, 3k8, 4k8 and 5k8 located at the Y2 side, and are set to the same voltage. Leading lines 28 for ground are disposed on the end of the Y2 side (the common counter electrode 4k1) of the common electrode 4k of the common electrode K (the common electrodes 1k, 2k, 3k, 4k and 5k). A control IC (control unit) 50, which will be described in detail later, is also connected to the end of the common electrode 4k.

Furthermore, in the common electrode 1k, the common counter electrode 1k8 and the common counter electrode 1k7 that are adjacent to each other in the Y direction are connected to a common counter electrode 1ka extending in the Y direction. The common counter electrode 1k6 and the common counter electrode 1k5 are connected to a common counter electrode 1kb. The common counter electrode 1k4 and the common counter electrode 1k3 are connected to a common counter electrode 1kc. The common counter electrode 1k5 and the common counter electrode 1k4 are connected to a common counter electrode 1kc. Furthermore, a common counter electrode 1kd extending in the Y direction is provided from the common counter electrode 1k2. Further, the common counter electrodes 1ka, 1kb, 1kc and 1kd extending in the Y direction, and the X detection electrode 1x are partially opposite to each other, and a capacitance is formed between them.

A pair of the common counter electrode 1k7 and the common counter electrode 1k6, a pair of the common counter electrode 1k5 and the common counter electrode 1k4, and a pair of the common counter electrode 1k3 and the common counter electrode 1k2 are disposed opposite to each other in a parallel way, and form the same parallel electrodes as the first embodiment.

Furthermore, in the same manner as the first embodiment, a plurality of common branch electrodes 22 extending in the X direction are formed in the X detection electrode 1x. The common branch electrodes 22 are disposed opposite to each other between the parallel electrodes formed by the pair of the common counter electrodes, thereby forming a first capacitance adjustment unit.

Furthermore, a plurality of the common branch electrodes 22 extending in the X1 and X2 directions are formed in the X detection electrode 2x. The common branch electrodes 22 are disposed opposite to each other between the parallel electrodes formed by the pair of the common counter electrodes in the common electrode 1k or the common electrode 2k, thereby forming a second capacitance adjustment unit.

In this case, if the common electrode 1k is set as the reference common electrode BK, the X detection electrode 1x corresponds to the first detection electrode XR, and the X detection electrode 2x corresponds to the second detection electrode XL. For this reason, in the same manner as the first embodiment, variations in the comprehensive composite capacitance C between the reference common electrode (the common electrode 1k) and the first detection electrode (the X detection electrode 1x) and between the reference common electrode (the common electrode 1k) and the second detection electrode (the X detection electrode 2x) can be kept low, that is, the composite capacitance C formed between the respective electrodes can be kept constant by means of the first capacitance adjustment unit and the second capacitance adjustment unit.

Further, this relationship can be applied between other common electrodes and other X detection electrodes in the same manner.

Meanwhile, in the Y detection electrode 8y extending in the X direction straightly, a capacitance is formed between the common counter electrodes 1k8, 3k8 and 5k8 located at the Y1 side of the Y detection electrode 8y. A capacitance is formed between the common counter electrodes 2k8 and 4k8 located at the Y2 side of the Y detection electrode 8y. That is, the five common counter electrodes 1k8, 2k8, 3k8, 4k8 and 5k8 are alternatively opposite to each other at locations of both sides of the Y detection electrode 8y, and a predetermined capacitance is formed between them.

In the same manner, even in the Y detection electrode 7y having the detours 26 and 26, the five common counter electrodes 1k7, 2k7, 3k7, 4k7 and 5k7 are alternatively opposite to each other at locations of both sides of the Y detection electrode 7y, and a predetermined capacitance is formed between them. In the same manner, a predetermined capacitance is formed through the five common counter electrodes even in the Y detection electrodes 6y, 5y, 4y, 3y and 2y other than the Y detection electrode 1y.

As shown in FIG. 9, however, the control IC 50 for applying a voltage of a predetermined sampling cycle between each of the X detection electrodes and the common electrode K and between each of the Y detection electrodes and the common electrode K and detecting displacement of each capacitance is provided in the base sheet 21. Leading lines 27 extending to a connector of the control IC 50 are connected to the ends of the X detection electrodes 1x, 2x, 3x, 4x, 5x and 6x formed on one surface of the base sheet 21, respectively, at the Y2 side.

Furthermore, on the other surface of the base sheet 21, the Y detection electrodes 1y, 2y, 3y and 4y are connected to the control IC 50 through leading lines 29 provided on the ends of the X2 side, respectively, and the Y detection electrodes 5y, 6y, 7y and 8y are connected to the control IC 50 through the leading lines 29 provided on the ends of the X1 side, respectively.

The leading lines 27, 28 and 29 are densely disposed at the Y2 side of the Y detection electrode 1y. Furthermore, the three insertion holes 21a, 21a and 21a are disposed opposite to each other at the Y1 side of the Y detection electrode 1y. In the Y detection electrode 1y, the common counter electrodes 2k1 and 4k1 of portions not having the insertion hole 21a are opposite to the Y1 side of the Y detection electrode 1y. A capacitance is formed at these portions. In portions having the insertion hole 21a, however, it is physically impossible to dispose the common counter electrodes in the Y detection electrode 1y. In addition, since the leading lines 27, 28 and 29 are densely disposed at the Y2 side of the Y detection electrode 1y, the common counter electrodes cannot be disposed at these portions.

Accordingly, a capacitance $C_{1y}$ for the Y detection electrode 1y is inevitably smaller than capacitances $C_{2y}$, $C_{3y}$, $C_{4y}$, $C_{5y}$, $C_{6y}$, $C_{7y}$ and $C_{8y}$, which are formed between the common counter electrodes 2k1 and 4k1, and the Y detection electrode 1y of two places disposed at the Y1 side, and are formed by the common counter electrodes at five places as in a capacitance for other Y detection electrodes 2y to 8y ($C_{1y} < C_{2y}$, $C_{3y}$, $C_{4y}$, $C_{5y}$, $C_{6y}$, $C_{7y}$, and $C_{8y}$) Accordingly, there is a disadvantage that a coordinate position according to the Y detection electrode 1y cannot be correctly detected.

In view of the above, according to the present invention, the first adjustment electrodes 1ya and 1yb that can be opposite to the common counter electrodes 1kd and 5kd through faces thereof are disposed in the Y detection electrode 1y. The operation thereof will be described below.

The common counter electrodes 1kd and 5kd are formed as electrodes that extend from the right and left sides of the insertion hole 21a in the Y direction. Meanwhile, the first adjustment electrodes 1ya and 1yb that extend from the Y detection electrode 1y in the Y1 direction are opposite to the common counter electrodes 1kd and 5kd through faces thereof at the ends of the X2 and X1 sides. As shown in FIGS. 10A and 10B, the first adjustment electrodes 1ya and 1yb, and the common counter electrodes 1kd and 5kd are opposite to each other through the base sheet 21 formed of a dielectric, which is disposed between them. A capacitance Ca proportional to an opposite area is formed between the first adjustment electrodes $1ya$ and $1yb$, and the common counter electrodes $1kd$ and $5kd$.

A width W of the opposite portion of each of the electrodes is larger than a film thickness d of the electrodes. Thus, in the case of a capacitance value of the electrodes per length, the capacitance Ca when the first adjustment electrodes $1ya$ and $1yb$ and the common counter electrodes $1kd$ and $5kd$ are made opposite to each other through the faces thereof can be sufficiently larger than a capacitance Cb when the film thickness d of the electrodes disposed parallel to each other is made opposite.

That is, the shortage of a capacitance $C_{1y}$ for the Y detection electrode $1y$ as compared with the capacitances $C_{2y}$, $C_{3y}$, $C_{4y}$, $C_{5y}$, $C_{6y}$, $C_{7y}$, $C_{8y}$, or the like for the Y detection electrodes $2y$ to $8y$ can be supplemented by the capacitance Ca formed by causing the first adjustment electrodes $1ya$ and $1yb$ and the common counter electrodes $1kd$ and $5kd$ to be opposite to each other through the faces thereof. Accordingly, all the capacitances for the Y detection electrodes $1y$ to $8y$ can be made to have the same value $(C_{1y} \sim C_{2y} \sim C_{3y} \sim C_{4y} \sim C_{5y} \sim C_{6y} \sim C_{7y} \sim C_{8y})$.

However, in the case in which the shortage of a capacitance cannot be supplemented by the capacitance Ca formed by the portion where the first adjustment electrodes $1ya$ and $1yb$ and the common counter electrodes $1kd$ and $5kd$ are opposite to each other through the faces thereof, the shortage of the capacitance can be supplemented by forming the second adjustment electrode $1yc$, which is adjacent to the first adjustment electrodes $1ya$ and $1yb$ and is parallel to them at a location where it does not overlap with the first adjustment electrodes $1ya$ and $1yb$ with the base sheet 21 interposed therebetween, and using the capacitance Cb formed between the second adjustment electrode $1yc$ and the common counter electrodes $1kd$ and $5kd$, as shown in FIGS. 9 and 10.

Furthermore, if the capacitance $C_{1y}$ for the Y detection electrode $1y$ is too larger than the capacitances $C_{2y}$, $C_{3y}$, $C_{4y}$, $C_{5y}$, $C_{6y}$, $C_{7y}$, and $C_{8y}$ for the other Y detection electrodes $2y$ to $8y$, an actual opposite area between the first adjustment electrodes $1ya$ and $1yb$, and the common counter electrodes $1k1$ and $5k1$ can be reduced by reducing the length of the first adjustment electrodes $1ya$ and $1yb$, as shown in FIG. 10A. As such, the capacitance $C_{1y}$ can be controlled to have the same value as the capacitances $C_{2y}$, $C_{3y}$, $C_{4y}$, $C_{5y}$, $C_{6y}$, $C_{7y}$ and $C_{8y}$. In this case, a control can be performed by cutting the first adjustment electrodes $1ya$ and $1yb$ and the common counter electrodes $1kd$ and $5kd$.

Further, the Y detection electrode $1y$ including the first adjustment electrodes $1ya$ and $1yb$, the common electrodes $1k$ and $5k$ including the common counter electrodes $1kd$ and $5kd$, and the like can be formed on the surface of the base sheet 21 by pattering a copper foil using an edging process, etc. They can also be easily cut.

Furthermore, in the case in which the length of the first adjustment electrodes $1ya$ and $1yb$ after cutting and the length of the common counter electrodes $1kd$ and $5kd$ after cutting are previously decided, they can be formed to have a predetermined value in the pattering step. In this case, this method is preferred in that the cutting process for adjustment can be unnecessary.

As such, in the second embodiment, even if common counter electrodes that form a capacitance cannot be disposed opposite to the Y detection electrode $1y$ because leading lines are densely disposed or holes are formed near the Y detection electrode $1y$ provided outside, the shortage of a capacitance can be supplemented. It is thus possible to correctly detect coordinate positions.

Further, in the second embodiment, the Y detection electrode $1y$ has been described as an example of the electrode disposed outside. However, the present invention is not limited thereto. The Y detection electrode $8y$ or the X detection electrode $1x$ or $6x$ can be used only if they are disposed outside.

According to a capacitive coordinate detection device of the present invention, holes can be freely provided in a base sheet constituting the coordinate detection device. For this reason, keys having stems can be used, and the stems can operate diaphragms. It is thus possible to give a pleasant feeling of clicking to an operator.

Furthermore, since light of light sources can be easily guided into the rear surface of keys, brighter illumination is possible.

Furthermore, electrode patterns are formed such that an increase or a decrease of a capacitance among electrodes is supplemented. Although detours are formed in the base sheet, coordinate positions can be detected with high accuracy.

Furthermore, even in the case in which common electrodes forming a capacitance cannot be disposed opposite to each other between detection electrodes disposed outside and a capacitance is insufficient because leading lines are densely disposed or holes are formed in the vicinity of Y detection electrodes or X detection electrodes disposed outside, such shortage of a capacitance can be supplemented by the construction electrodes, and coordinate positions can be correctly detected.

The invention claimed is:

1. A capacitive coordinate detection device in which a plurality of detection electrodes, which extend in the Y direction and are disposed with a predetermined gap in the X direction, each detection electrode being applied with a voltage, and a plurality of common electrodes, which are located between the detection electrodes adjacent to each other and extend in the Y direction, are formed in a base sheet, and in which when a contact body serving as a conductor is brought into contact with or approaches the base sheet, variations in a capacitance between the detection electrodes and the common electrodes opposite to the detection electrodes are detected to detect a location of a place which the contact body touches or approaches on an XY coordinate plane, wherein when one of the common electrodes is set as a reference common electrode, one of the detection electrodes, which is adjacent to one side of the reference common electrode, is set as a first detection electrode, and one of the detection electrodes, which is adjacent to the other side of the reference common electrode, is set as a second detection electrode, detours that approach one of the reference common electrode and the first detection electrode, and the reference common electrode and the second detection electrode are formed in at least the other one of the reference common electrode and the first detection electrode, and the reference common electrode and the second detection electrode in a specific place, and wherein when a capacitance between the reference common electrode and the first detection electrode is set to CR and a capacitance between the reference common electrode and the second detection electrode is set to CL, a pattern of each of the electrodes is set such that a composite capacitance between the capacitance CR and the capacitance CL can be kept constant in such a manner that one of the two capacitances compensates for an increase or a decrease of the other of the two capacitances.

2. The capacitive coordinate detection device according to claim 1,
wherein holes are formed in the base sheet, and detours are formed at sides of the holes.

3. The capacitive coordinate detection device according to claim 2,
wherein operation members are provided at one side of the base sheet and electronic components operated by the operation members are provided at the other side of the base sheet,
some of the operation members pass through the holes to operate the electronic components.

4. The capacitive coordinate detection device according to claim 2,
wherein light sources for illumination are disposed in the holes of the base sheet, and the holes serve as passages of light emitted from the light sources.

5. The capacitive coordinate detection device according to claim 1,
wherein common branch electrodes extending toward both sides of the X direction and formed with a predetermined gap in the Y direction are formed in the reference common electrode, first auxiliary electrodes, which extend in the X direction and are opposite to the common branch electrodes, are formed in the first detection electrode, and second auxiliary electrodes, which extend in the X direction and are opposite to the common branch electrodes, are formed in the second detection electrode, and
the common branch electrodes and the first auxiliary electrodes are provided in the detours or near the detours, and the common branch electrodes and the second auxiliary electrodes are not opposite to each other in the detours or near the detours.

6. The capacitive coordinate detection device according to claim 1,
wherein common branch electrodes extending toward both sides of the X direction and formed with a predetermined gap in the Y direction are formed in the reference common electrode, first auxiliary electrodes, which extend in the X direction and are opposite to the common branch electrodes, are formed in the first detection electrode, and second auxiliary electrodes, which extend in the X direction and are opposite to the common branch electrodes, are formed in the second detection electrode, and
in the detours or near the detours, an opposite length between the common branch electrodes and the first auxiliary electrodes is larger than an opposite length between the common branch electrodes and the second auxiliary electrodes.

7. The capacitive coordinate detection device according to claim 1,
wherein the X direction is replaced with the Y direction, and the Y direction is replaced with the X direction.

8. The capacitive coordinate detection device according to claim 7,
wherein both a coordinate position of the X direction and a coordinate position of the Y direction of a contact place of the contact body are input.

9. A capacitive coordinate detection device including a base sheet having a plurality of holes formed therein, a plurality of X detection electrodes, which extend in the Y direction and are disposed with a predetermined gap in the X direction, on one surface of the base sheet, each X detection electrode being applied with a voltage, a plurality of Y detection electrodes, which extend in the X direction and are disposed with a predetermined gap in the Y direction, on the other surface of the base sheet, each Y detection electrode being applied with a voltage, a plurality of common electrodes that are opposite to both X detection electrodes adjacent to each other and Y detection electrodes adjacent to each other, the X detection electrodes and the Y detection electrodes being provided on any one surface of the base sheet, a control unit for applying the voltage between the X detection electrodes and the common electrodes and between the Y detection electrodes and the common electrodes with a predetermined timing, and a plurality of leading lines connecting the X detection electrodes and the Y detection electrodes and the control unit,
wherein the leading lines are densely provided near the outside of the X detection electrodes or the Y detection electrodes located at one end, and holes are disposed opposite to the leading lines near the inside of the X or Y detection electrodes, and
first adjustment electrodes, which adjust a capacitance between the X detection electrodes or the Y detection electrodes and the common electrodes by causing the X detection electrodes or the Y detection electrodes and the common electrode to be opposite to each other face to face, are formed on one of the X detection electrodes or the Y detection electrodes and the common electrode with the base sheet interposed therebetween.

10. The capacitive coordinate detection device according to claim 9
wherein second adjustment electrodes, which are adjacent to the first adjustment electrodes and opposite to each other at locations where the second adjustment electrodes do not overlap each other with the base sheet interposed therebetween, are formed in one of the X detection electrodes or the Y detection electrodes and the common electrode, which are opposite to each other with the base sheet interposed therebetween.

11. The capacitive coordinate detection device according to claim 9,
wherein common counter electrodes, which are opposite to both a pair of the X detection electrodes adjacent to each other and a pair of the Y detection electrodes adjacent to each other and extend by detouring the holes, are disposed in the common electrodes.

* * * * *

UNITED STATES PATENT AND TRADEMARK OFFICE
CERTIFICATE OF CORRECTION

| | | |
|---|---|---|
| PATENT NO. | : 7,589,713 B2 | Page 1 of 1 |
| APPLICATION NO. | : 11/206319 | |
| DATED | : September 15, 2009 | |
| INVENTOR(S) | : Sato | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 786 days.

Delete the phrase "by 786 days" and insert -- by 1065 days --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,589,713 B2 Page 1 of 1
APPLICATION NO. : 11/206319
DATED : September 15, 2009
INVENTOR(S) : Tadamitsu Sato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1344 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,589,713 B2 | Page 1 of 1 |
| APPLICATION NO. | : 11/206319 | |
| DATED | : September 15, 2009 | |
| INVENTOR(S) | : Tadamitsu Sato | |

It is certified that error appears in the above-identified patent and that said Letters Patent is hereby corrected as shown below:

This certificate supersedes the Certificate of Correction issued April 27, 2010. The Certificate of Correction is vacated since decision dated April 21, 2010, which corrects the patent term adjustment "by 1,344 days" was issued in error. The [*] Notice is corrected to reflect the decision dated March 29, 2010, which correctly determined the patent term adjustment --by 1,065--.

On the Title Page:

The first or sole Notice should read --

Subject to any disclaimer, the term of this patent is extended or adjusted under 35 U.S.C. 154(b) by 1,065 days.

Signed and Sealed this

Seventh Day of December, 2010

David J. Kappos
*Director of the United States Patent and Trademark Office*